US012560857B2

(12) United States Patent　　　　(10) Patent No.: US 12,560,857 B2
　　　Kang et al.　　　　　　　　　　(45) Date of Patent: Feb. 24, 2026

(54) CAMERA MODULE

(71) Applicant: SAMSUNG ELECTRO-MECHANICS CO., LTD., Suwon-si (KR)

(72) Inventors: Taewon Kang, Suwon-si (KR); Sanghun Han, Suwon-si (KR); Jaehyuk Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 27 days.

(21) Appl. No.: 18/797,185

(22) Filed: Aug. 7, 2024

(65) Prior Publication Data

US 2025/0172856 A1　　May 29, 2025

(30) Foreign Application Priority Data

Nov. 23, 2023　(KR) ........................ 10-2023-0163938
Apr. 2, 2024　(KR) ........................ 10-2024-0044619

(51) Int. Cl.
*G03B 17/12*　　(2021.01)
*G03B 17/17*　　(2021.01)
(52) U.S. Cl.
CPC ............. *G03B 17/12* (2013.01); *G03B 17/17* (2013.01)
(58) Field of Classification Search
CPC .............. G01S 5/16; G02B 2027/0138; G02B 2027/014; G02B 2027/0178; G02B 2027/0187; G02B 27/01; G02B 27/0172; G02B 27/0179; G06F 3/011; G06F 3/013; G06F 3/017; G06V 10/25; G06V 20/20; G06V 40/18; G06V 40/28; H04N 23/61;

H04N 23/63; H04N 23/65; H04N 23/651; H04N 23/667; H04N 23/815; H04N 23/90; H04N 25/42; H04N 25/46; H04N 5/2628

See application file for complete search history.

(56) References Cited

U.S. PATENT DOCUMENTS 9,448,389 B1 *　9/2016　Kozko ................... G02B 13/06
12,321,086 B2 *　6/2025　Kang ..................... G03B 30/00
(Continued)

FOREIGN PATENT DOCUMENTS

JP　　2021-177247 A　11/2021
KR　10-2022-0020020 A　2/2022
KR　10-2022-0148086 A　11/2022

OTHER PUBLICATIONS

Korean Office Action issued on Mar. 31, 2025, in corresponding Korean Patent Application No. 10-2024-0044619. (3pages in English, 4pages in Korean).

(Continued)

*Primary Examiner* — Antoinette T Spinks
(74) *Attorney, Agent, or Firm* — NSIP Law

(57) ABSTRACT

A camera module is provided. The camera module includes a housing including an inner space; a reflection module accommodated in the inner space; and a lens module disposed to allow light of which a path has been changed by the reflection module to pass through, wherein the reflection module includes: a reflection member configured to change a path of incident light incident in a first direction; a holder configured to support the reflection member, and a reinforcement structure at least partially embedded in an inner portion of the holder and disposed between the reflection member and the holder.

20 Claims, 10 Drawing Sheets

(56)            References Cited

U.S. PATENT DOCUMENTS

| | | | |
|---|---|---|---|
| 2018/0017844 A1 | 1/2018 | Yu et al. | |
| 2020/0048073 A1* | 2/2020 | Baran | G01S 7/4817 |
| 2020/0348479 A1* | 11/2020 | Kwon | G03B 30/00 |
| 2020/0351421 A1* | 11/2020 | Park | H04N 23/6812 |
| 2020/0379213 A1 | 12/2020 | Li et al. | |
| 2022/0350108 A1 | 11/2022 | Shin et al. | |
| 2023/0176451 A1* | 6/2023 | Lee | G03B 30/00 |
| | | | 396/351 |
| 2023/0185168 A1* | 6/2023 | Kang | G03B 5/00 |
| | | | 359/726 |
| 2023/0239560 A1* | 7/2023 | Im | H02K 5/24 |
| | | | 396/439 |
| 2023/0266643 A1 | 8/2023 | Lee et al. | |

OTHER PUBLICATIONS

Korean Office Action Issued on Sep. 12, 2025, in Counterpart Korean Patent Application No. 10-2024-0044619 (1 Page in English, 2 Pages in Korean).

* cited by examiner

CAMERA MODULE

CROSS-REFERENCE TO RELATED APPLICATIONS

This application claims the benefit under 35 USC § 119 (a) of Korean Patent Application No. 10-2024-0044619 filed in the Korean Intellectual Property Office on Apr. 2, 2024, and Korean Patent Application No. 10-2023-0163938 filed in the Korean Intellectual Property Office on Nov. 23, 2023, the entire disclosures of which are incorporated herein by reference for all purposes.

BACKGROUND

1. Field

The following description relates to a camera module.

2. Description of Related Art

Cameras are implemented in portable electronic devices such as, but not limited to, smart phones, tablet personal computers (PCs), and laptops, and cameras for mobile terminals may have an autofocus operation (AF), an optical image stabilization (OIS) operation, and a zoom operation (Zoom).

Additionally, the camera module may be equipped with an actuator that directly moves a lens module or indirectly moves a reflection module including a reflection member for optical image stabilization. Additionally, the actuator may usually move or rotate the lens module or reflection module in various directions by using a driving force generated by a magnet and a coil.

In addition to being driven by the actuator, the lens module or reflection module may rotate or move within a housing due to external impacts such as shaking or the falling of the camera module. In this example, as the size and weight of the actuator increases due to the higher performance of the camera module, the impact force transmitted to the reflection member increases, and cracks may occur in the reflection member, thereby causing a problem in securing reliability.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a camera module includes a housing including an inner space; a reflection module accommodated in the inner space; and a lens module disposed to allow light of which a path has been changed by the reflection module to pass through, wherein the reflection module includes a reflection member configured to change a path of incident light incident in a first direction; a holder configured to support the reflection member, and a reinforcement structure at least partially embedded in an inner portion of the holder, and disposed between the reflection member and the holder.

The reflection member may include an inclined surface that is inclined obliquely to a reference line that is parallel to the first direction, and the reinforcement structure may include an inclined portion that is parallel with the inclined surface of the reflection member, and is disposed to overlap the inclined surface of the reflection member in the first direction.

The inclined portion may include a first inclined portion that is disposed on a first side of the inclined surface of the reflection member in the first direction.

The inclined portion may further include a second inclined portion that is disposed on a second side of the inclined surface of the reflection member in the first direction.

The second inclined portion may include at least one first penetration hole that penetrates the inclined surface of the reflection member in a vertical direction.

The reinforcement structure may include a first reinforcing member configured to support a first side of the inclined surface of the reflection member in the first direction; and a second reinforcing member configure to support a second side of the inclined surface of the reflection member in the first direction.

The reinforcement structure may further include a connecting member that extends from a first side of the first reinforcing member to a first side of the second reinforcing member to connect the first reinforcing member and the second reinforcing member.

The second reinforcing member may include an expansion portion that expands in a plane parallel to the first direction, and is disposed on one side of the reflection member; and an extension portion that extends from the expansion portion in a second direction that is perpendicular to the first direction.

The second reinforcing member may be provided in a plurality, and the plurality of second reinforcing members is disposed such that each expansion portion faces in the second direction.

The expansion portion may include at least one second penetration hole penetrating in the second direction.

The holder may include a seating portion on which the reflection member is seated, and comprises a bottom surface corresponding to the inclined surface of the reflection member, and the seating portion may have a groove portion in which a part of the bottom surface is depressed in the first direction.

The holder may be configured to guide a motion of a ball member disposed between the housing and the holder, and may include a guide groove with an opening that is hexagonal in a planar shape.

The lens module may include a plurality of lens barrels arranged in a third direction parallel to an optical axis direction.

The plurality of lens barrels may include a fixed lens barrel that is fixed to the housing; and a movable lens barrel that is configured to move relative to the housing.

The reinforcement structure may be configured to have a higher rigidity than a rigidity of the holder.

The reinforcement structure may include stainless steel.

The reinforcement structure may include a damper which extends from one side of the reinforcement structure in the first direction.

The damper may be configured to protrude from one side of the reinforcement structure through the holder in the first direction.

The reflection member may include an inclined surface that is inclined at an angle to a reference line that is parallel with the first direction, and the reinforcement structure may include a first reinforcing member configured to support a first portion of the inclined surface of the reflection member in the first direction; and a second reinforcing member configured to support a second portion of the inclined surface of the reflection member in the first direction, and the damper is disposed on a first side of the first reinforcing member.

The first reinforcing member may include a hole that penetrates one side of the first reinforcing member in the first direction, and the damper is inserted into the hole.

Other features and aspects will be apparent from the following detailed description, the drawings, and the claims.

Figure 1:
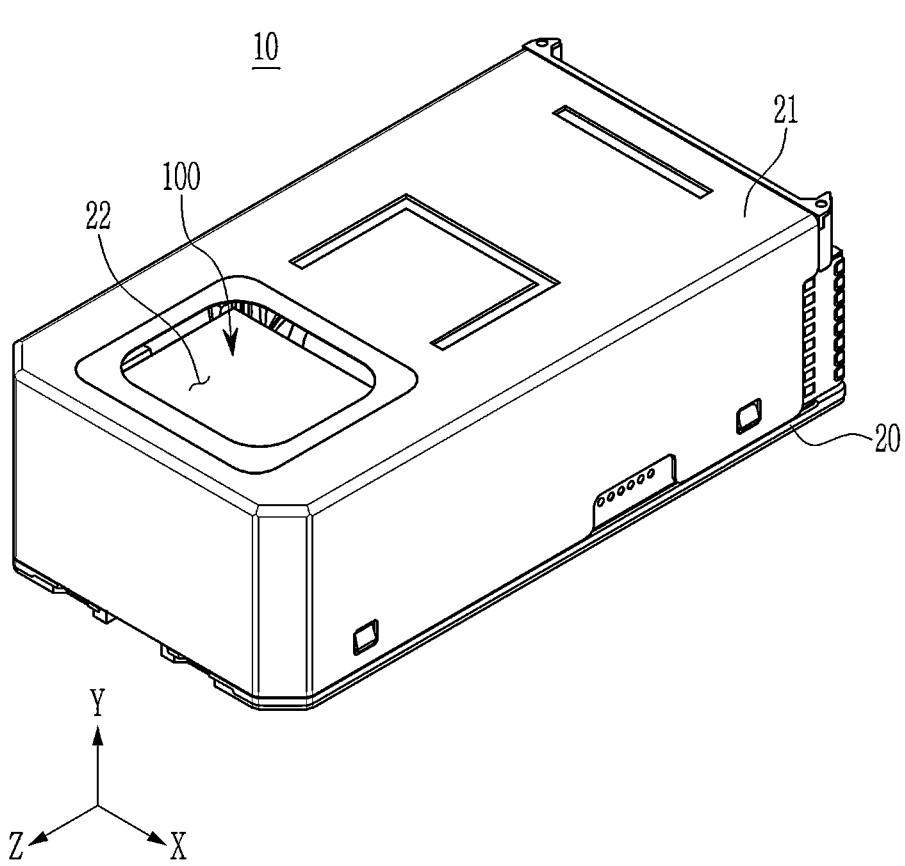
FIG. 1 illustrates a perspective view of an example camera module, in accordance with one or more embodiments.

Throughout the drawings and the detailed description, unless otherwise described, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Throughout the specification, when a component or element is described as "on," "connected to," "coupled to," or "joined to" another component, element, or layer, it may be directly (e.g., in contact with the other component, element, or layer) "on," "connected to," "coupled to," or "joined to" the other component element, or layer, or there may reasonably be one or more other components elements, or layers intervening therebetween. When a component or element is described as "directly on", "directly connected to," "directly coupled to," or "directly joined to" another component element, or layer, there can be no other components, elements, or layers intervening therebetween. Likewise, expressions, for example, "between" and "immediately between" and "adjacent to" and "immediately adjacent to" may also be construed as described in the foregoing.

The terminology used herein is for describing various examples only and is not to be used to limit the disclosure. The articles "a," "an," and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

Further, throughout the specification, the phrase "on a plane" means viewing a target portion from the top, and the phrase "on a cross-section" means viewing a cross-section formed by vertically cutting a target portion from the side.

In the entire specification, when it is described that a part is "coupling (coupling)" with another part, it includes not only "directly or physically coupled", but also "indirectly or non-contact coupling" while disposing another element therebetween.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment (e.g., as to what an example or embodiment may include or implement) means that at least one example or embodiment exists where such a feature is included or implemented, while all examples are not limited thereto. The use of the terms "example" or "embodiment" herein have a same meaning (e.g., the phrasing "in one example" has a same meaning as "in one embodiment", and "one or more examples" has a same meaning as "in one or more embodiments").

One or more example may provide a camera module that can improve an occurrence of cracks in a reflection member and secure reliability by reducing the stress transmitted to the reflection member.

Figure 2:
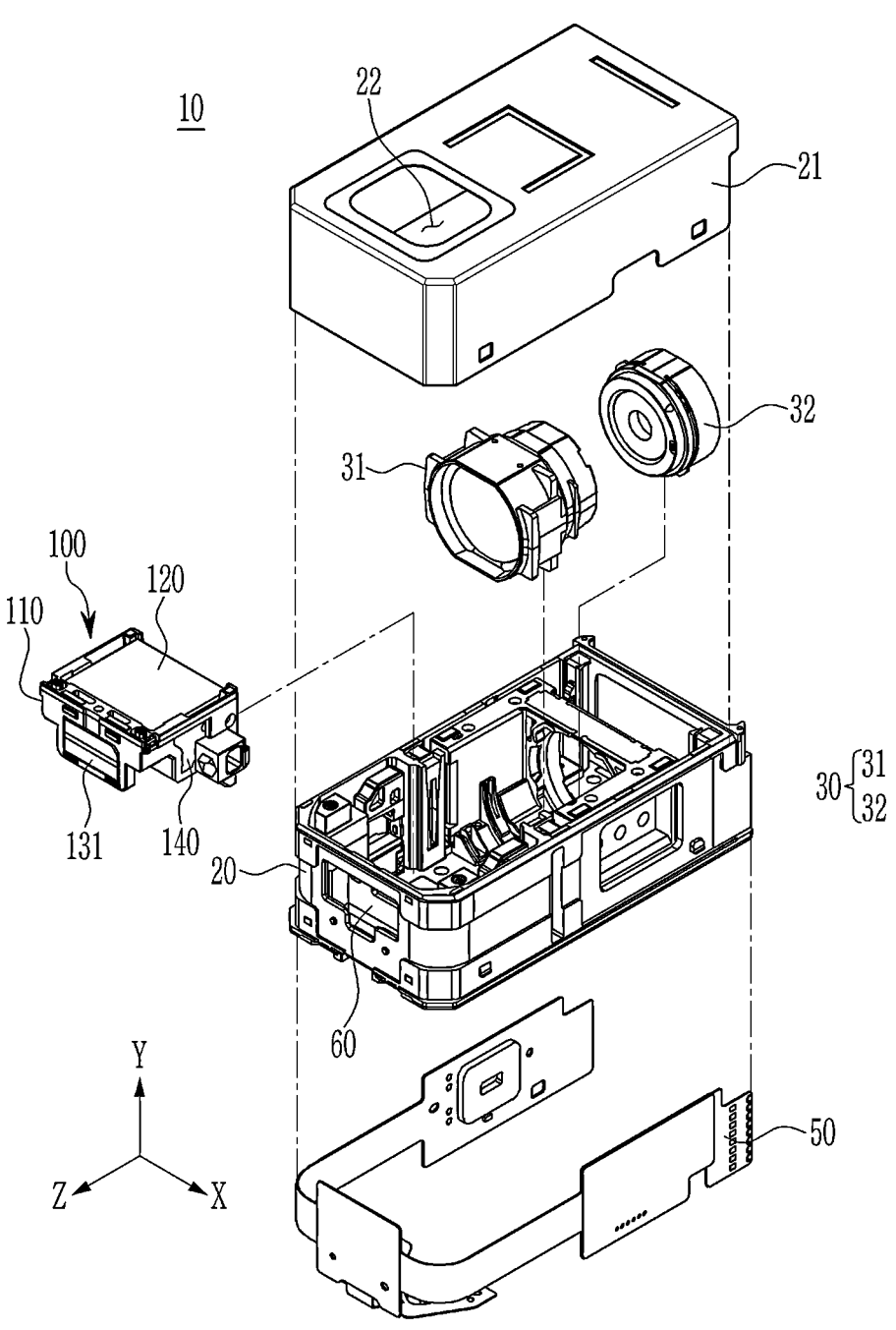
FIG. 2 illustrates an exploded perspective view of an example camera module in accordance with one or more embodiments.

FIG. 1 illustrates a perspective view of an example camera module according to one or more embodiments, and FIG. 2 illustrates an exploded perspective view of an example camera module according to one or more embodiments.

A camera module 10 according to one or more embodiments may include a housing 20 provided with an inner space, a reflection module 100 provided in the inner space of the housing 20, a lens module 30 (31 and 32) including at least one lens barrel, an image sensor module (not shown), and a cover 21 covering an upper portion of the housing 20.

The reflection module 100 may be configured to change a moving direction of incident light. The moving direction of light originating from a subject (not shown) outside the camera module 10 may be changed to be directed to the lens module 30 through the reflection module 100. For example, a path of the light incident in a thickness direction (e.g., a Y-axis direction) of the camera module 10 through an opening 22 formed by opening at least a portion of the surface of the cover 21 may be changed to roughly match an optical axis direction (e.g., Z-axis direction) of the lens module 30 by the reflection module 100. In order to change the light path, the reflection module 100 may be provided with a reflection member 120 that reflects light. The camera module 10 according to one or more embodiments may perform an optical image stabilization (OIS) operation by rotating the reflection member 120 included in the reflection module 100 around a rotation axis or moving in various directions.

The camera module 10 may be provided with a guide member 60 that guides the movement of the reflection module 100. The guide member 60 is provided adjacent to the reflection module 100 and may guide the reflection module 100 to rotate around a certain axis or to move in a certain direction. In an example, the guide member 60 may be provided with a ball member (115) or a pivot member (not shown) that forms the rotation axis of the reflection module 100, or a rail member (not shown) that forms the movement path of the reflection module 100.

The lens module 30 includes one or more lens barrels 31 and 32 that accommodate a lens through which light of which a path has been changed by the reflection module 100 passes. As the lens barrels 31 and 32 move in the optical axis direction (Z-axis direction) or as a spacing is adjusted, an auto focusing (AF) operation or a zoom operation may be implemented. Alternatively, each of the lens barrel 31 and 32 may move to perform a shake correction operation.

The lens module 30 may include a plurality of lens barrels arranged in a third direction parallel to the optical axis direction (Z-axis direction). The lens module 30 may include a fixed lens barrel 31 that is fixed to the housing 20, and a movable lens barrel 32 that is configured to move with respect to the housing 20. In an example, one or more movable lens barrels 32 may be provided.

An image sensor module (not shown) that includes an image sensor that converts light passing through the lens module into an electric signal may be disposed behind the lens module 30. The image sensor module may further include an optical filter (not shown) that filters light incident through the lens module 30.

In the camera module 10 according to one or more embodiments, the reflection module 100 may be provided in front of the lens module 30 with the lens module 30 as the center in the internal space of the housing 20, and an image sensor module may be provided behind the lens module 30. Accordingly, incident light incident from a subject outside the camera module 10 may sequentially pass through the reflection module 100 and the lens module 30 and then enter the image sensor module.

The image sensor module may be electrically connected to the printed circuit board (PCB) 50 and can transmit image information to the outside of the camera module 10 in the form of an electrical signal.

Meanwhile, in one or more embodiments, the camera module 10 may be configured by combining a reflection module assembly including the reflection module 100 and a lens module assembly provided adjacent to the reflection module assembly. In an example, the reflection module assembly may include the reflection module 100 and the housing having the inner space in which the reflection module 100 is movably accommodated as described. The lens module assembly may include the lens module 30, then image sensor module (not shown), and the housing 20 having the inner space to accommodate them. The housing of the reflection module assembly and the housing of the lens module assembly may be integrally formed with each other, or may be provided as separate housings. In this example, separate housings may be combined with each other to form the entire housing of the camera module 10.

In the one or more embodiments, the reflection module 100 may be accommodated inside the housing 20 of the camera module 10 and may change the path of incident light. For example, as shown in FIG. 2, the reflection module 100 may be accommodated adjacent to the lens module 30 inside the housing 20, and may change the path of incident light incident in the thickness direction (e.g., Y-axis direction) of the camera module 10 to the optical axis direction (e.g., Z-axis direction) of the lens module 30.

In the one or more embodiments, the reflection module 100 includes a reflection member 120 that can change the light path, a holder 110 that supports the reflection member 120, and a driver 130 that moves the holder 110.

The reflection member 120 of the reflection module 100 may change the path of light by refracting or reflecting incident light. In an example, a moving path of the light incident on the reflection member 120 in the first direction (Y-axis direction) may be changed to the Z-axis direction that intersects the first direction (Y-axis direction) based on the reflection member 120. The reflection member 120 is provided to reflect or refract incident light. In an example, the reflection member 120 may change the path of light incident from an external subject to the optical axis direction (e.g., Z-axis direction) of the lens module 30. The reflection member 120 may be, as examples, a mirror or prism that reflects light, but is not limited thereto, and may be any material that can change the path of light. In the following description, it is assumed that the reflection member 120 has the shape of a prism.

The holder 110 supports the reflective member 120 to be movable. That is, the reflection member 120 is supported by the holder 110, and thus may move within a predetermined range. For example, the holder 110 may rotate around a rotation axis (e.g., an axis parallel to the X-axis) passing through the holder 110, or may reciprocate within a certain range. Accordingly, the reflection member 120 supported by the holder 110 may rotate or reciprocate according to the movement of the holder 110.

The holder 110 may be made of an injection material that is easy to shape through an injection process. The holder 110 may be made of materials such as, but not limited to, resin or plastic.

At least some surfaces of the holder 110 are provided with a driver 130 that moves the holder 110. For example, as shown in FIG. 2, the driver 130 may be provided at an end in one direction (e.g., Z-axis direction) of the holder 110. Additionally, the driver 130 may be provided at an end in the other direction (e.g., Y-axis direction) of the holder 110. The driver 130 may be an electron actuator formed of a magnet (e.g., 131 in FIG. 3) and a coil (e.g., 132 in FIG. 3), but is not limited thereto, and may be any element that moves the holder 110 within a certain range.

Meanwhile, in the one or more embodiments, the reflection module 100 may further include a position detector (not shown) that detects the amount of movement of the holder 110.

The reflection module 100 may perform a shake correction operation by rotating or moving the holder 110 and the reflection member 120 supported by the holder 110 inside the housing 20 based on the driving force generated by the driver 130.

As described above, the camera module 10 may include the driver 130 to perform a shake compensation operation with the movably provided reflection member 120. As high-performance camera modules are being developed, the size and weight of the driver 130 are increasing, and accordingly, the impact force applied to the reflective member 120 when the lens module falls may increase. Additionally, there is a concern that it may become difficult to secure reliability when evaluating the drop reliability of the reflection module 100. Accordingly, in order to secure the reliability of the reflection module 100 even when the size and weight of the driver 130 are increased, a reinforcing structure 140 may be inserted inside the holder 110.

Hereinafter, referring to FIG. 3 to FIG. 6, a reflection module 100 according to one or more embodiments will be described.

Figure 3:
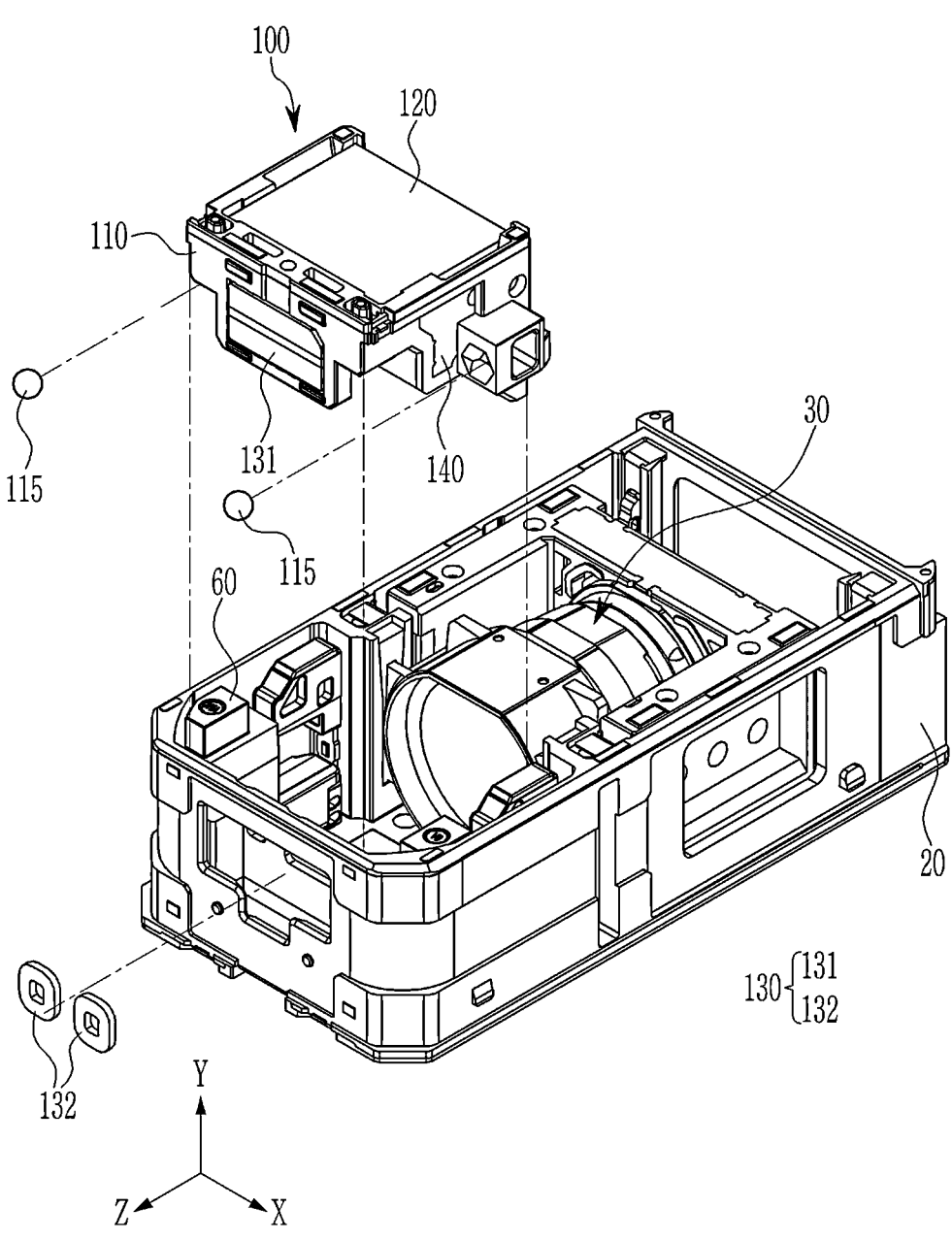
FIG. 3 illustrates an exploded perspective view of a housing and a reflection module in an example camera module, in accordance with one or more embodiments.
Figure 4:
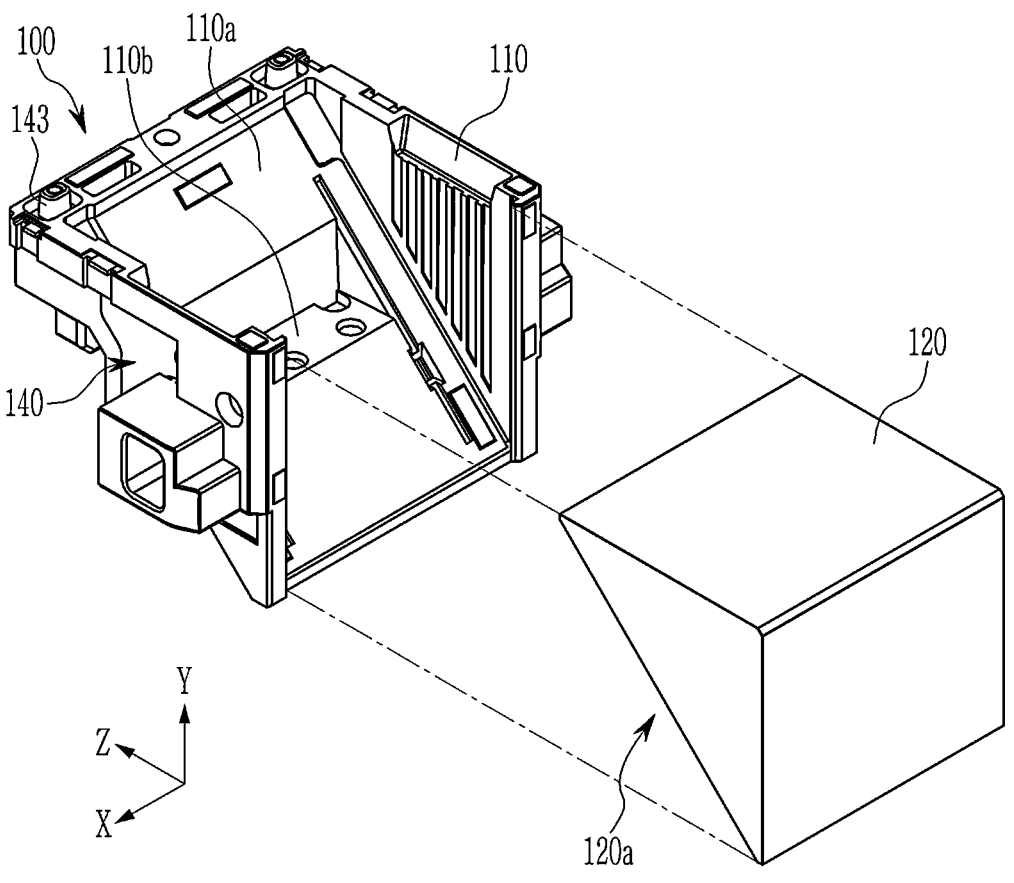
FIG. 4 illustrates an exploded perspective view of a reflection module, in accordance with one or more embodiments.
Figure 5:
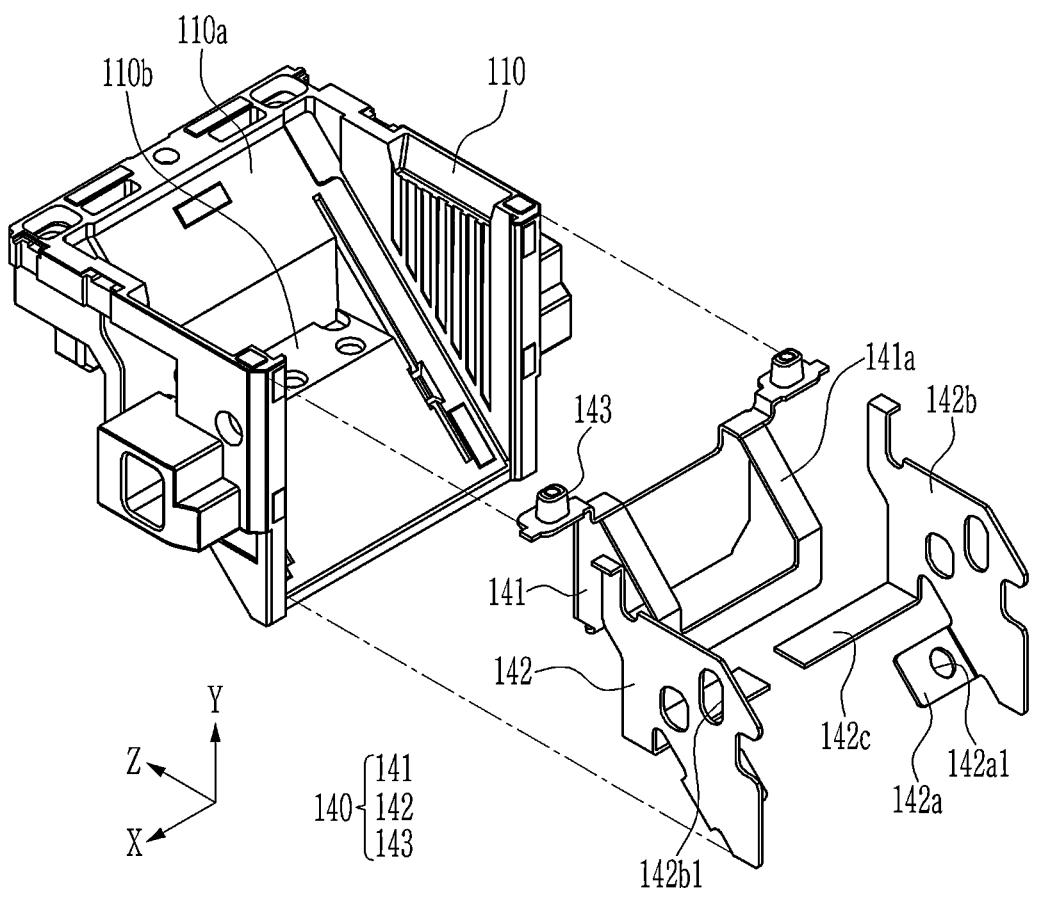
FIG. 5 illustrates an exploded perspective view of a holder, in accordance with one or more embodiments.
Figure 6:
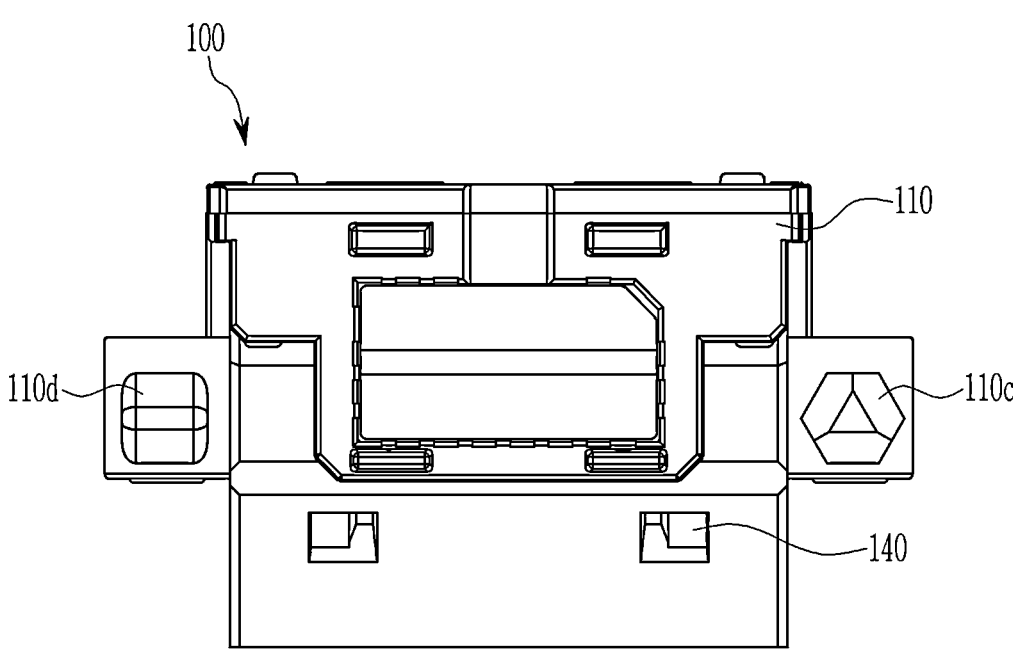
FIG. 6 illustrates a top plan view of a reflection module, in accordance with one or more embodiments.
Figure 6:
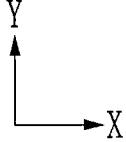

FIG. 3 is an exploded perspective view of a housing and a reflection module in an example camera module according to the one or more embodiments, FIG. 4 is an exploded perspective view of a reflection module according to the one or more embodiments, FIG. 5 is an exploded perspective view of a holder according to the one or more embodiments, and FIG. 6 is a top plan view of a reflection module according to the one or more embodiments. FIG. 6 is a top plan view of a reflection module 100 in the X-Y plane.

Referring to FIG. 3 to FIG. 5, a reflection module 100 according to the one or more embodiments may include a reflection member 120 that can change a light path, a holder 110 that supports the reflection member 120, a driver 130 that moves the holder 110, and a reinforcement structure 140 that is at least partially embedded in the inside of the holder 110 to be disposed between the reflection member 120 and the holder 110.

The holder 110 may have a seating portion 110*a* on which the reflection member 120 is seated. The seating portion 110*a* may have a surface that forms an angle with a line parallel to a first direction (Y-axis direction), which is the light incident direction. The seating portion 110*a* may have a shape in which at least one surface of the holder 110 is recessed.

The reflection member 120 may have an incident surface and an exit surface. The reflection member 120 may refract or reflect light incident on the incident surface and change the path of the light to head toward the exit surface and the lens module 30 disposed behind the exit surface.

The reflection member 120 may have an inclined surface 120*a* that is inclined obliquely with respect to a reference line that is parallel to the first direction (Y-axis direction). The inclined surface 120*a* may be a surface connected to the incident surface and the exit surface. The inclined surface 120*a* may have a shape corresponding to the seating portion 110*a*. The seating portion 110*a* may have a bottom surface corresponding to the inclined surface 120*a*. The inclined surface 120*a* is disposed on the seating portion 110*a* such that the reflection member 120 may be mounted on the holder 110. The seating portion 110*a* may have a portion 110*b* of which a bottom surface is partially recessed in the first direction (Y-axis direction).

The driver 130 may include a magnet 131 provided in the holder 110 and a coil 132 provided to face the magnet 131. However, the configuration of the driver 130 is not limited to this, and may be configured with anything that can move the reflection module 100.

The reinforcement structure 140 may be disposed between the reflection member 120 and the holder 110. The reinforcement structure 140 may be at least partially embedded within the holder 110. The reinforcement structure 140 may be arranged to overlap a portion of the holder 110 that forms the seating portion 110*a*. In an example, the reflection member 120 and the reinforcement structure 140 may be integrally formed by an insert molding method.

The reinforcement structure 140 may have higher rigidity than the holder 110. The reinforcement structure 140 may include stainless steel.

The reinforcement structure 140 may have an inclined portion that is parallel to the inclined surface 120*a*. The inclined portion may be arranged to overlap the inclined surface of the reflection member 120 according to the first direction (Y-axis direction). The reflection member 120 may include a first portion disposed on one side in the first direction (Y-axis direction) of the inclined surface 120*a*, and a second portion disposed on the other side in the first direction (Y-axis direction). In other words, the first portion may be disposed at an upper portion and the second portion may be disposed at a lower portion according to the first direction (Y-axis direction).

The reinforcement structure 140 may include a first reinforcing member 141 disposed to support the first portion of the reflection member 120, a second reinforcing member 142 disposed to support the second portion of the reflection member 120, and a damper 143 disposed on one side of the first reinforcing member 141 and extending in the first direction (Y-axis direction). In other words, the first reinforcing member 141 may be configured to support the upper portion of the reflection member 120, and the second reinforcing member 142 may be configured to support the lower portion of the reflection member 120.

The inclined portion may include a first inclined portion 141*a* disposed to support the first portion of the reflection member 120, and a second inclined portion 142*a* disposed to support the second portion. The first inclined portion 141*a* may be disposed on a first side of the inclined surface 120*a* of the reflection member 120 in the first direction (Y-axis direction). The second inclined portion 142*a* may be disposed on a second side of the inclined surface 120*a* of the reflection member 120 in the first direction (Y-axis direction). In other words, the first reinforcing member 141 may include the first inclined portion 141*a*, and the second reinforcing member 142 may include the second inclined portion 142*a*. The first inclined portion 141*a* may have a plate shape that is parallel to the inclined surface 120*a*. The second inclined portion 142*a* may have a plate shape that is parallel to the inclined surface 120*a*.

Figure 8:
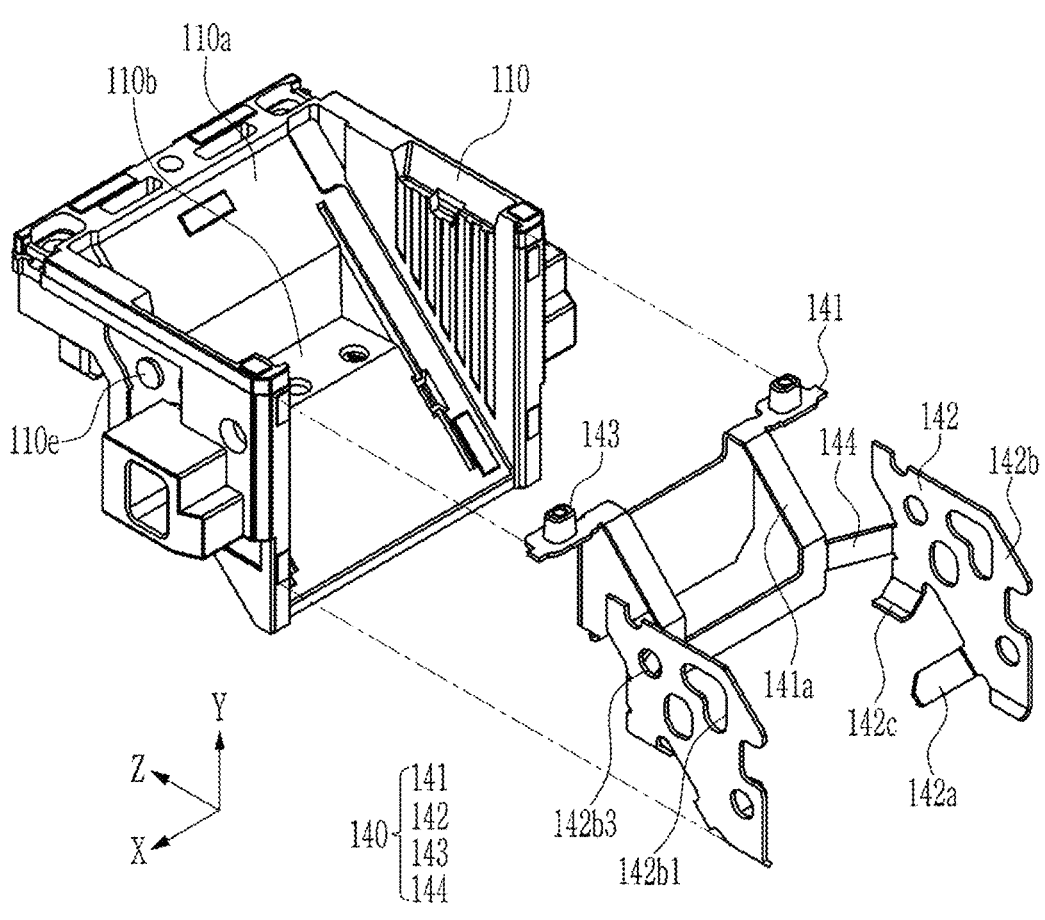
FIG. 8 illustrates an exploded perspective view of a holder, in accordance with one or more embodiments.

The second inclined portion 142*a* may have at least one first penetration hole 142*a*1 that penetrates the inclined surface 120*a* in a vertical direction. A weight of the reinforcement structure 140 may be adjusted by forming the first penetration hole 142*a*1 in the second inclined portion 142*a*. However, that is only an example, and as shown in FIG. 8, which will be described later, it is also possible that a penetration hole is not formed in the second inclined portion 142*a*.

The first reinforcing member 141 may further include a portion that is bent and extended from the first inclined portion 141*a*. As an example, the first reinforcing member 141 may further include a portion that is bent from the first inclined portion 141*a* and extends in a direction parallel to the first direction (Y-axis direction). Additionally, the first reinforcing member 141 may include a plane parallel to the first direction (Y-axis direction) and the second direction (X-axis direction).

The second reinforcing member 142 may have an expansion portion 142*b* disposed on one side of the reflection member 120 and an extension portion 142*c* that is seated in a groove portion 110*b*. The expansion portion 142*b* may be expanded to a plane parallel to the first direction (Y-axis direction). The expansion portion 142*b* may reinforce the rigidity of a side surface of the reflection member 120 in the second direction (X-axis direction) that is perpendicular to the first direction (Y-axis direction). The expansion portion 142*b* may protect the side surface of the reflection member 120 in the second direction (X-axis direction) from external impact.

The expansion portion 142*b* may have at least one second penetration hole 142*b*1 that penetrates in the second direction (X-axis direction). A second penetration hole 142*b*1 may be formed in the expansion portion 142*b* such that the weight of the reinforcement structure 140 can be adjusted. However, this is not restrictive, and it is also possible that no penetration hole is formed in the expansion portion 142*b*. In an example, the second reinforcing member 142 may be provided in plurality. The plurality of second reinforcing member 142 may be arranged such that each expansion portion 142*b* faces the second direction (X-axis direction).

An extension portion 142*c* may extend in the second direction (X-axis direction) from the expansion portion 142*b*. The extension portion 142*c* may reinforce the rigidity of a portion of the inclined surface 120*a* of the reflection member 120. The extension portion 142*c* may protect the inclined surface 120*a* of the reflection member 120 from external impact. The extension portion 142*c* may be arranged to overlap the groove portion 110*b* in the first direction (Y-axis direction). The second reinforcing member 142 may be provided in plurality. The plurality of second reinforcing members 142 may be arranged such that each extension portion 142*c* faces the second direction (X-axis direction). Referring to FIG. 5, the plurality of extension portions 142*c* are shown to be spaced apart from each other, but this is only an example, and the plurality of extension portions 142*c* may extend to contact each other. In this example, the plurality of extension portions 142*c* may be integrally connected.

The reinforcement structure 140 may include a damper 143 arranged to extend from one side of the reinforcement structure in the first direction (Y-axis direction). The damper 143 may be placed on one side of first reinforcing member 141. The damper 143 may be disposed on one side of the first reinforcing member 141 in the first direction (Y-axis direction). As an example, the first reinforcing member 141 may have a hole that penetrates one side in the first direction (Y-axis direction), and the damper 143 may be inserted into the hole of the first reinforcing member 141. However, this is only an example, and the position of the damper 143 may be any position as long as it is protruded from one side of the holder 110 on the first reinforcing member 141 in the first direction (Y-axis direction).

The damper 143 may extend in the first direction (Y-axis direction). The damper 143 may be protruded from one side of the reinforcement structure in the first direction (Y-axis direction) of the holder 110 with the reinforcement structure 140 inserted into the holder 110. The damper 143 may contain a resin material having elasticity. When the reflection module 100 is impacted in the optical axis direction, the damper 143 may protect the reflection module 100 by absorbing the impact.

Referring to FIG. 6, the holder 110 may include a guide groove that guides the motion of a ball member (115) positioned between the housing 20 and the holder 110 on one side in a third direction (Z-axis direction) that is perpendicular to the first direction (Y-axis direction) and the second direction (X-axis direction).

The guide groove may include a first guide groove 110*c* and a second guide groove 110*d*. The first guide groove 110*c* may be positioned in one edge region of the holder 110. An opening of the first guide groove 110*c* may have a hexagon cross-section shape. An interior wall surface of the first guide groove 110*c* may be inclined in a direction toward the bottom of the groove, and accordingly, the bottom surface of the first guide groove 110*c* may have a triangular flat shape.

The second guide groove 110*d* may be disposed on one edge region where the first guide groove 110*c* is disposed and on the other edge region opposite to the second direction (X-axis direction). In an example, the second guide groove 110*d* may have a polygon or circular cross-section shape, but is not limited thereto, and may have any shape that is distinct from the first guide groove 110*c*. It may be easily adjusted even if the mass center point of the reflection module changes due to the addition of a reinforcing member by forming the first guide groove and the second guide groove in different shapes.

Hereinafter, referring to FIG. 7 and FIG. 8, a reflection module 100 according to another embodiment will be described in detail.

Figure 7:
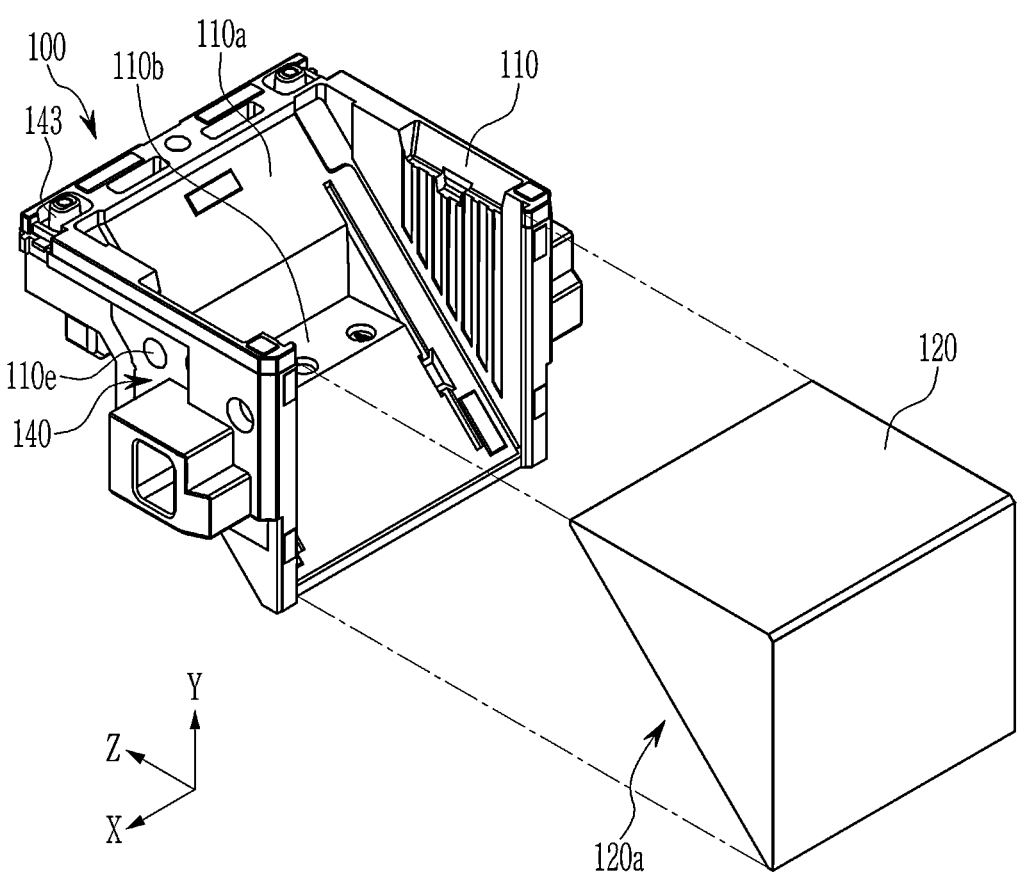
FIG. 7 illustrates an exploded perspective view of a reflection module, in accordance with one or more embodiments.

FIG. 7 illustrates an exploded perspective view of a reflection module according to another embodiment, and FIG. 8 illustrates an exploded perspective view of a holder according to another embodiment.

Referring to FIG. 7 and FIG. 8, a reflection module 100, in accordance with one or more embodiments, is similar to the reflection module 100 described above with reference to FIG. 3 to FIG. 6. Detailed descriptions of the same components are omitted.

Referring to FIG. 7 to FIG. 8, a reflection module 100, in accordance with one or more embodiments, may further include a protruding portion 110e and a connecting member 144 compared to the reflection module according to an embodiment shown in FIG. 3 to FIG. 6.

The holder 110 may have a protruding portion 110e on one side that is configured to be inserted into a third penetration hole 142b3. The protruding portion 110e may be disposed on one side of the holder 110 that faces a reflection member 120 in a second direction (X-axis direction). The protruding portion 110e may have a protrusion shape protruded from one side of the holder 110 in the second direction. In an example, the protruding portion 110e may be provided in plurality, and the plurality of protruding portions 110e may be arranged to face each other in the second direction (X-axis direction). As the reflection module has a protruding portion into which a penetration hole can be inserted, the reinforcing member can be more stably guided to the required position.

A reinforcement structure 140 may further include a connecting member 144 configured to connect a first reinforcing member 141 and a second reinforcing member 142. The connecting member 144 may extend from one side of the first reinforcing member 141 to one side of the second reinforcing member 142. The connecting member 144 may be integrated with the first reinforcing member 141 and the second reinforcing member 142. Since the reflection module may be provided with the connecting member, the structural stability of the reinforcing member can be more easily secured during an external impact.

In the camera module according to the above-described embodiments, the rigidity of the reflection module is secured such that the reinforcing member and the holder may be subjected to greater stress when evaluating drop reliability. Accordingly, the occurrence of cracks in the reflection member can be improved and reliability can be secured by reducing the stress transmitted to the reflection member. Additionally, the load applied to the reflection module can be distributed by reducing bending deformation during an external collision. Additionally, even when the size and weight of the reflection member in a camera module with excellent optical performance increases, the reflection module may have high rigidity and structural reliability, and the generation of foreign matter can be solved by facilitating absorption of impact force between injection molded products.

Figure 9:
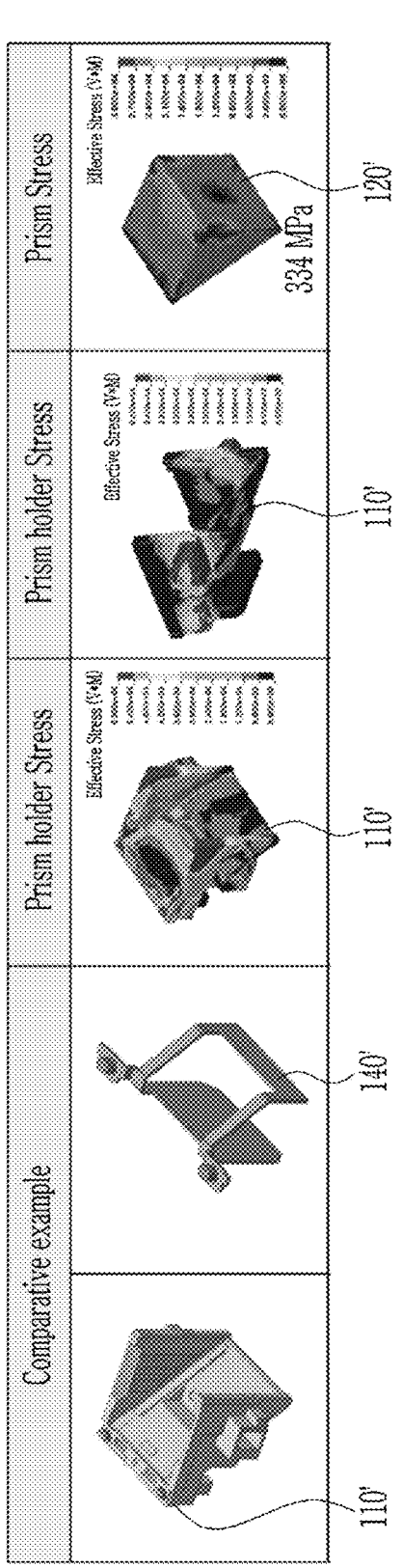
FIG. 9 illustrates the stress distribution upon impact of the reflection module in a comparative example.
Figure 10:
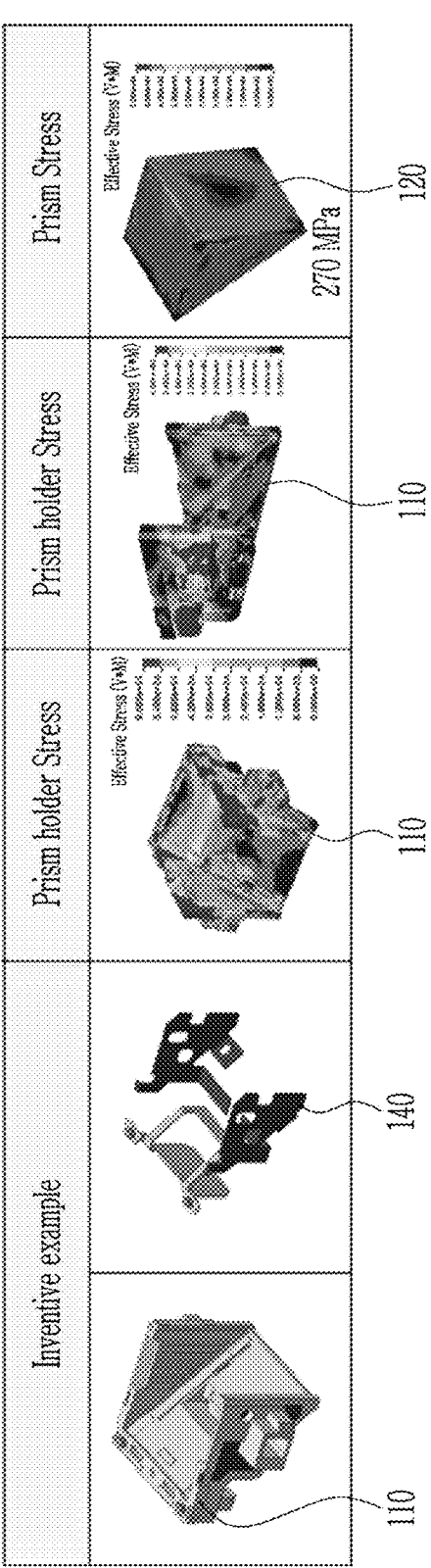
FIG. 10 illustrates the stress distribution upon impact of the reflection module in accordance with one or more embodiments.

Hereinafter, referring to FIG. 9 and FIG. 10, the effect of stress distribution upon impact of the camera module 10, according to an embodiment, will be described. FIG. 9 and FIG. 10 illustrate results of simulation to measure the stress for each position applied to the reflection module when the camera module is impacted.

FIG. 9 illustrates the stress distribution upon impact of the reflection module in a comparative example, and FIG. 10 illustrates the stress distribution upon impact of the reflection module in an embodiment.

Referring to FIG. 9 and FIG. 10, compared to a holder 110' and a reinforcement structure 140' of a reflection module according to a comparative example, it may be confirmed that the holder 110 and the reinforcement structure 140 of the reflection module of the example embodiments receive greater stress upon impact. Specifically, compared to the holder 110' and the reinforcement structure 140' in the comparative example, it may be confirmed that the areas receiving large stress are distributed more widely in the corner region of the holder 110 and the reinforcement structure 140 in the example embodiments. As the holder 110 and the reinforcement structure 140 of the embodiment receive greater stress, it may be confirmed that the stress transmitted to the reflection member 120 of the embodiment decreases compared to a reflection member 120' of the comparative example. In other words, it may be confirmed that the holder 110 where the reinforcement structure 140 of the embodiment is disposed has higher rigidity, the reflection member 120 can be prevented from being damaged.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. A camera module, comprising:
a housing comprising an inner space;
a reflection module accommodated in the inner space; and
a lens module disposed to allow light of which a path has been changed by the reflection module to pass through,
wherein the reflection module comprises:
a reflection member configured to change a path of incident light incident in a first direction;
a holder configured to support the reflection member, and
a reinforcement structure at least partially embedded in an inner portion of the holder, and disposed between the reflection member and the holder.

2. The camera module of claim 1, wherein:
the reflection member comprises an inclined surface that is inclined obliquely to a reference line that is parallel to the first direction, and
the reinforcement structure comprises an inclined portion that is parallel with the inclined surface of the reflection member, and is disposed to overlap the inclined surface of the reflection member in the first direction.

3. The camera module of claim 2, wherein the inclined portion comprises a first inclined portion that is disposed on a first side of the inclined surface of the reflection member in the first direction.

4. The camera module of claim 3, wherein the inclined portion further comprises a second inclined portion that is disposed on a second side of the inclined surface of the reflection member in the first direction.

5. The camera module of claim 4, wherein the second inclined portion comprises at least one first penetration hole that penetrates the inclined surface of the reflection member in a vertical direction.

6. The camera module of claim 2, wherein:

the reinforcement structure comprises:

a first reinforcing member configured to support a first side of the inclined surface of the reflection member in the first direction; and a second reinforcing member configure to support a second side of the inclined surface of the reflection member in the first direction.

7. The camera module of claim 6, wherein:

the reinforcement structure further comprises a connecting member that extends from a first side of the first reinforcing member to a first side of the second reinforcing member to connect the first reinforcing member and the second reinforcing member.

8. The camera module of claim 6, wherein:

the second reinforcing member comprises:

an expansion portion that expands in a plane parallel to the first direction, and is disposed on one side of the reflection member; and an extension portion that extends from the expansion portion in a second direction that is perpendicular to the first direction.

9. The camera module of claim 8, wherein:

the second reinforcing member is provided in a plurality, and the plurality of second reinforcing members is disposed such that each expansion portion faces in the second direction.

10. The camera module of claim 9, wherein:

the expansion portion comprises at least one second penetration hole penetrating in the second direction.

11. The camera module of claim 2, wherein:

the holder comprises a seating portion on which the reflection member is seated, and comprises a bottom surface corresponding to the inclined surface of the reflection member, and the seating portion has a groove portion in which a part of the bottom surface is depressed in the first direction.

12. The camera module of claim 1, wherein:

the holder is configured to guide a motion of a ball member disposed between the housing and the holder, and comprises a guide groove with an opening that is hexagonal in a planar shape.

13. The camera module of claim 1, wherein the lens module comprises a plurality of lens barrels arranged in a third direction parallel to an optical axis direction.

14. The camera module of claim 13, wherein:

the plurality of lens barrels comprise:

a fixed lens barrel that is fixed to the housing; and a movable lens barrel that is configured to move relative to the housing.

15. The camera module of claim 1, wherein the reinforcement structure is configured to have a higher rigidity than a rigidity of the holder.

16. The camera module of claim 1, wherein the reinforcement structure comprises stainless steel.

17. The camera module of claim 1, wherein the reinforcement structure comprises a damper which extends from one side of the reinforcement structure in the first direction.

18. The camera module of claim 17, wherein the damper is configured to protrude from one side of the reinforcement structure through the holder in the first direction.

19. The camera module of claim 17, wherein:

the reflection member comprises an inclined surface that is inclined at an angle to a reference line that is parallel with the first direction, and the reinforcement structure comprises:

a first reinforcing member configured to support a first portion of the inclined surface of the reflection member in the first direction; and a second reinforcing member configured to support a second portion of the inclined surface of the reflection member in the first direction, and the damper is disposed on a first side of the first reinforcing member.

20. The camera module of claim 17, wherein:

the first reinforcing member comprises a hole that penetrates one side of the first reinforcing member in the first direction, and the damper is inserted into the hole.

* * * * *